Dec. 20, 1932.                    G. GIANOLIO                        1,891,810
                 LEVEL GAUGE INDICATING AT A DISTANCE THE
                  LEVEL OF A LIQUID CONTAINED IN A TANK
                       Filed Dec. 1, 1928            2 Sheets-Sheet 1

Inventor,
Giuseppe Gianolio,
By Henry Orth Jr.
       Atty.

Dec. 20, 1932.                    G. GIANOLIO                    1,891,810
                LEVEL GAUGE INDICATING AT A DISTANCE THE
                LEVEL OF A LIQUID CONTAINED IN A TANK
                        Filed Dec. 1, 1928              2 Sheets-Sheet 2

Inventor
Giuseppe Gianolio
By Henry Ortly
        Atty

Patented Dec. 20, 1932

1,891,810

UNITED STATES PATENT OFFICE

GIUSEPPE GIANOLIO, OF TURIN, ITALY

LEVEL GAUGE INDICATING AT A DISTANCE THE LEVEL OF A LIQUID CONTAINED IN A TANK

Application filed December 1, 1928, Serial No. 323,061, and in Italy May 25, 1928.

An object of the present invention is a level gauge indicating at a distance the level of a liquid contained in a tank, characterized by a transmitter fitted inside or outside the tank and at any distance from same, and by an indicator located at any distance; the transmitter includes two independent cisterns, two tubes of the indicator intercommunicate at one end by means of a bridge connection, and at the other end, through two distinct connecting pipes; each tube communicates separately, with the bottom of the corresponding cistern; a part of each cistern and a part of its corresponding tube and all the connecting pipe between being filled with a liquid (G), the remaining part of the two tubes and all the bridge connection being filled up completely with a liquid (O) of a different density and not mixable with the former; while upon the liquid of one of the cisterns, the transmitting one, acts the liquid contained in the tank plus the pressure of the air or gas above the liquid in the tank through a siphon connected to the top of the transmitting cistern and having a leg reaching the bottom of the tank. Upon the liquid of the other cistern acts only the pressure above the liquid in the tank. Any change of level in the tank, resulting in a change of the hydrostatic pressure, due to the liquid in the tank acting upon the liquid of the transmitting cistern, will be indicated by a corresponding change of level of the plane of separation, functioning as an index, between the two liquids contained in the tubes.

Figure 16:
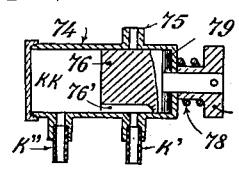
Figure 7:
Figure 4:
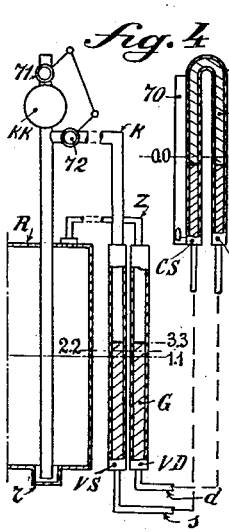
Figure 5:
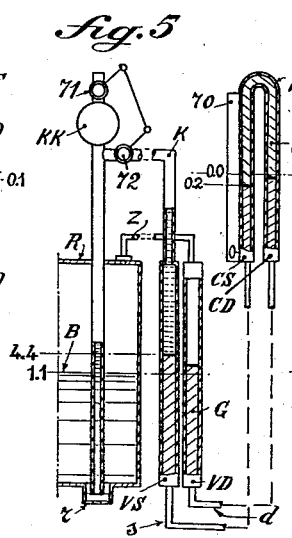
Figure 8:
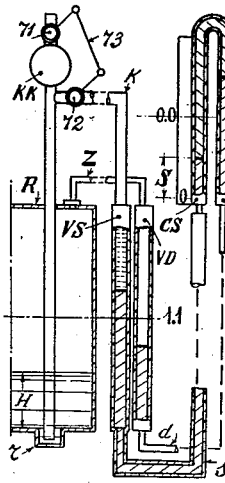
Figure 9:
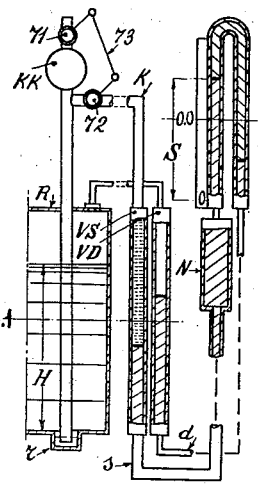
Figure 10:
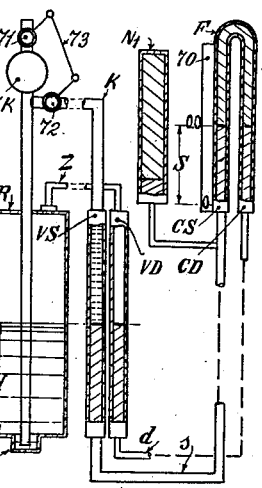
Figure 11:
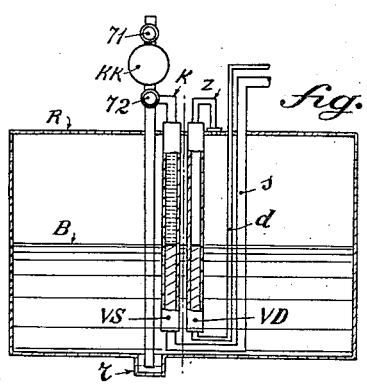
Figure 15:
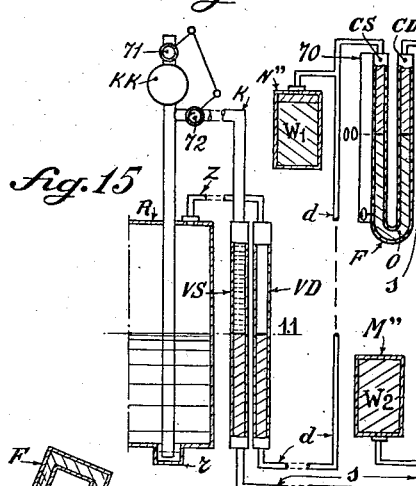
Figure 12:
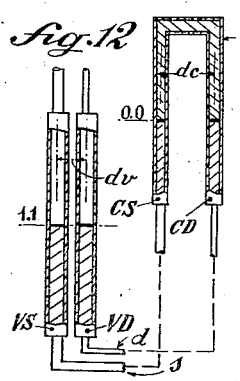
Figure 13:
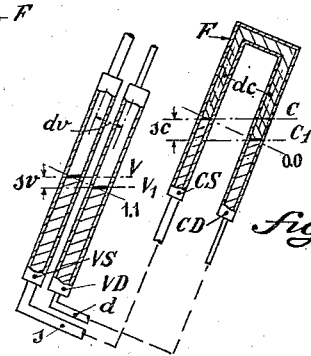
Figure 14:
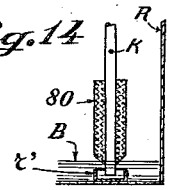

Some of the constructional forms of the object of the invention are shown, outlined and only by way of example in the drawings annexed, in which:—Figs. 1, 2, 3, 4, 5 and 6 show in elevation and partially in section a first form of execution of the apparatus for different working conditions:—Fig. 7 is a detail of compensator:—Figs. 8, 9 and 10 exhibit variances of this first form of execution:—Fig. 11 shows the transmitter fitted inside the tank:—Figs. 12 and 13 display in detail a particular relative disposition of the cisterns and tubes:—Fig. 14 is a detail:—Fig. 15 shows in elevation and partially in section a second form of execution of the apparatus:—Fig. 16 is a longitudinal section of a priming cock.

*Transmitter.*—Contained in a tank R or outside of same there are two vertical and adjacent tubes: VS and VD (for a better understanding let us call: VS the left cistern, VD the right cistern). The top of cistern VS is connected to the tank by means of one leg of the siphon K whose other vertical leg reaches down into a small depression —r— of the bottom of the tank; also cistern VD is connected to the tank by means of the pipe connection Z which however stops at the top of the tank.

*Indicator.*—Where the indication of the level of the liquid contained in the tank is needed, there are two other vertical and adjacent tubes: CS and CD (for a better understanding let us call: CS the left tube, CD the right tube) intercommunicating at their higher ends by means of a bridge connection F. The tube CS is made of glass and at its side is the scale 70 suitably graduated.

*Connection pipes.*—The bottom of the left cistern VS is connected to the foot of the left tube CS by means of a connecting pipe —s— which may be set horizontally or howsoever inclined or also vertically; the bottom also of the right cistern VD is connected to the foot of the right tube by means of the connecting pipe —d— which shall be set parallel to —s—.

*Liquids G and O.*—A liquid G, that may be termed the transmitting liquid, fills completely the two connecting pipes —s— and —d—, and, when the tank is empty, only half portion of the two tubes CS and CD and of the two cisterns VS and VD. A liquid O, that may be termed the indicating liquid fills the remainder of the two tubes CS and CD and the bridge connection F with exclusion of air or gas, the capital letter O hereinafter will also be used as the symbol for the volume of indicating liquid contained in the apparatus. The liquid O is of less density and of different colour from liquid G (Fig. 1), it functions like a liquid piston that separates in two parts the total volume of liquid G contained in the apparatus: the part contained in tube CS, cistern VS and connecting pipe —s— and the part contained in tube CD, cistern VD and connecting pipe —d—, the resulting volumes of liquid G to be referred to hereinafter as (volume) GS and (volume) GD respectively.

If (Fig. 1 tank empty) the level of the liquid G inside the two tubes lies on the same horizontal plane —0.0— and inside the two cisterns on the same horizontal plane —1.1—, there will be a perfect equilibrium between the columns of liquids G and O contained inside the two parts, left and right, of the apparatus: any column of liquid G or O in the left part (VS, CS, s) that has a tendency to alter the position of the level of G will be counteracted by a column of equal height (hydrostatical) and density in the right part (VD, CD, d). The plane of separation between G and O, clearly visible inside the left tube CS made of glass, will change its position, along the graduated scale 70 adjoining at any eventual cause of perturbation that should take place in the said condition of equilibrium and will function as an index.

Let us suppose the tank R filled with a liquid B up to the level —1.1— and the siphon K charged (Fig. 2), then to the said columns of liquids G and O other columns of liquid B will be added, the latter however counterbalance themselves: it follows that no change of the levels of liquid G will take place and therefore the index will not move along the graduated scale.

Figure 3:
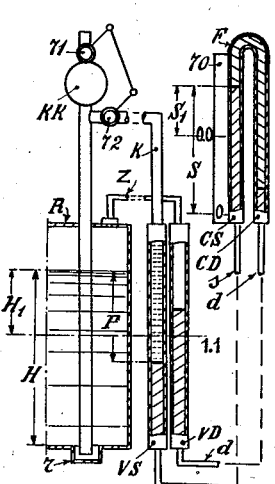

If the level of the liquid B in the tank rises (Fig. 3) the precedent equilibrium (Fig. 2) will be disturbed: all the column $H_1$ of liquid B above the horizontal line —1.1— (taken as a base line) will act on the liquid G of the left cistern whose level will fall and the index will rise an amount $S_1$ (above the other base line —0.0—) along the graduated scale. (Fig. 3.)

It will be possible to calculate the condition of equilibrium between the working columns of the liquids B, G and O, independently from the pressure of the air or gas above the liquid B in the tank because this pressure will act equally upon the liquid G of the two cisterns and is therefore eliminated.

For a negative column $H_1$ also, that is for a level of B below to the horizontal line —1.1— the index will move, in this case it will fall below line —0.0—. The position of the index corresponding to the tank empty (but for the small depression r in order not to have the siphon discharged) will be the "zero" of the graduated scale.

*Observation.*—For the truthful functioning of the apparatus it is necessary that the pressure of the air or gas above the liquid B contained in the tank should always be great enough to prevent the formation of the barometrical void inside the bridge connection F. Therefore the vertical distance between the bottom of the tank and the higher point of F is limited. If the transmitter is located at the side or inside the tank that pressure should be (by way of approximation) the equivalent of the hydrostatic pressure of a column of liquid G of a height equal to said distance.

Till now it has been supposed that the temperature $t$, was constant and with this supposition it is possible to calculate $S_1$ (or S) (Fig. 3) as a function of $H_1$ (or H), of the densities at $t°$ degrees of the liquids B, G and O and of the sectional area of the cisterns and tubes; the sections of the connecting pipes —s— and —d— are of no import.

Let us fix the following symbols:

| Liquids | B | G | O |
|---|---|---|---|
| Density at $t°$ | $\delta 1$ | $\delta 2$ | $\delta 3$ |
| Density at $(t+x)°$ | $\delta 11$ | $\delta 22$ | $\delta 33$ |
| Coefficient of apparent cubic expansion referring to container | $\alpha_1$ | $\alpha_2$ | $\alpha_3$ |

| | Cisterns | | Tubes | |
|---|---|---|---|---|
| | VS | VD | CS | CD |
| Cross sectional areas | $\sigma_1$ | $\sigma_2$ | $\sigma$ | $\sigma_3$ |
| Variation of levels of G corresponding to the change of level $S_1$ of the index | $S_1\dfrac{\sigma}{\sigma_1}$ | $S_1\dfrac{\sigma}{\sigma_2}$ | $S_1$ | $S_1\dfrac{\sigma}{\sigma_3}$ |

With the adopted symbols from Fig. 3 we obtain:

$$\delta 1\left(H_1 + S_1\frac{\sigma}{\sigma_1}\right) = \left(S_1 + S_1\frac{\sigma}{\sigma_2}\right)(\delta 2 - \delta 3) + \left(S_1\frac{\sigma}{\sigma_1} + S_1\frac{\sigma}{\sigma_3}\right)\delta 2$$

whence:

$$S_1 = H_1 \frac{\delta 1}{(\delta 2 - \delta 3) + \dfrac{\sigma}{\sigma_1}(\delta 2 - \delta 1) + \dfrac{\sigma}{\sigma_2}(\delta 2 - \delta 3) + \dfrac{\sigma}{\sigma_3}\delta 2}$$

Per $H_1 = 1$. the precedent formula gives the travel of the index along the scale per unit of variation of the height of the liquid B in the tank. Let us write briefly:—

Index travel per unit =

$$\frac{\delta 1}{(\delta 2 - \delta 3) + \dfrac{\sigma}{\sigma_1}(\delta 2 - \delta 1) + \dfrac{\sigma}{\sigma_2}(\delta 2 - \delta 3) + \dfrac{\sigma}{\sigma_3}\delta 2} \quad (I)$$

The graduation of the scale will vary accordingly to the densities of the liquids to be gauged, and will be uniform if the scale has been graduated for indicating the height of the liquid in the tank.

*Observation.*—As the density of any liquid varies with the temperature the "index travel per unit" will accordingly vary for the same liquid with the variation of the temperature, therefore the scale graduated at $t°$ degrees to give per direct reading the level of the liquid B, will not be correct if the temperature rises or falls. To have the "index travel per unit" for a temperature $(t+x)°$ ($x$ positive or negative) the new values of the densities at the temperature $(t+x)°$ of the liquids B, G and O ought to be substituted in the Formula (I).

The percentage of error made in reading at $(t+x)°$ the height H of the liquid B on a scale graduated for the temperature $t°$ is given by the ratio:

$$\frac{\text{Index travel per unit at } t° = \text{Index travel per unit at } (t+x)°}{\text{Index travel per unit at } t°}$$

Chosen G and O among the liquids incongealable at a low temperature, in case of B=benzine and per $x=35°$ degrees (centigrade scale), the reading would be 3,60% short per a positive $x$ for benzine. The absolute value of this error will be smaller when H is smaller, precisely when the greatest precision is necessary. This 3,60% error would shrink to only 0,55% if the scale had been graduated for giving not the height but the content in weight (kilograms—pounds) of the benzine in the tank; but it is evident that in this case the horizontal section of the tank should be constant.

*Error due to the shifting of the position of the zero of the graduated scale when the temperature of the liquids G and O contained in the apparatus varies and its correction*

Telling of the error made while reading at the temperature $(t+x)°$ on the scale graduated for the temperature $t°$ the height of the liquid B in the tank, it has not been considered till now a second error corresponding to a shifting of the position of the zero due to the apparatus itself and originated particularly by the variation of the volume of the two liquids G and O contained in the apparatus. It is right to call this error: "error of the shifting of the zero" because this error is constant, that is: independent from the height of the liquid B in the tank. When the temperature varies not only the densities, and therefore the "index travel per unit," but also vary the two volumes GS and GD of transmitting liquid filling the left (VS, CS and —s—) and the right (VD, CD and —d—) part of the apparatus and the volume O of indicating liquid filling the indicator proper, and as a consequence the levels of G inside the cisterns and tubes. If $\alpha_3$ (see—symbols table) is the coefficient of cubic expansion of the indicating liquid O on a rise of temperature from $t°$ to $(t+x)°$ the volume O of the liquid O contained in the two tubes and bridge connection F becomes: $O+O\alpha_3.x=O+o''$; $O\alpha_3.x$ being the volume increase of the volume O (capital letter) of the indicating liquid due to a raise of $x$ degrees of its temperature, and $o$ (lower case letter) its symbol.

Let us suppose: the tank empty, $$\sigma=\sigma_2, \sigma_1=\sigma_3,$$

section of —s—=section of —d—, the two parts left (VS, CS and —s—) and right (VD, CD and —d—) of the apparatus will contain the same amount of transmitting liquid, (volume GS will be equal to volume GD) and the same amount (O/2) of indicating liquid, because of this and as a consequence of a rise of the temperature of the liquid O the level of G will fall inside the two tubes from the base line —0.0— (Figs. 1 and 4) to the horizontal line —0.1—, meantime the level of G inside the two cisterns will rise above the base line —1.1— to the horizontal line —2.2—. Moreover because of the expansion of the volumes GS and GD the level of G inside the two cisterns will rise further from —2.2— to —3.3—.

In the case being examined (symmetry between left and right part of the apparatus) one would say that to the expansion of the volumes GS, GD and O should correspond only a fall of the index equal to:

$$\frac{o}{2}\frac{1}{\sigma}=\frac{o}{2\sigma}=\frac{O\alpha_3 x}{2\sigma}$$

and this really happens if the tank is empty and if there is not any liquid B inside the apparatus (siphon and left cistern) (Fig. 4), because one half=

$$\frac{o}{2}$$

of the volume increase=$o=O.\alpha 3.x$ of the volume O of indicating liquid will arrange itself in the left tube CS and the other half in the right tube CD forming inside said tubes columns of equal length below the line —0.0—, the height $$\frac{o}{2\sigma}$$

of each liquid column resulting from dividing its volume $$\frac{o}{2}$$

by its section $\sigma$ ($=\sigma_2$), but if the tank is filled up to line —1.1— (Fig. 5) and the siphon is charged, the column from —1.1— to —3.3— of liquid B contained in the vertical leg of the siphon (inside the tank) not being counterbalanced by an equivalent liquid column outside said leg will have a sucking action, because of its hydrostatic weight, over the liquid G of the left cistern: in the said cistern the level of G will rise further from —3.3— to —4.4—, that is till a new equilibrium is attained: the index in the left tube, as a consequence, will fall further down from —0.1— to —0.2—.

The total shifting of the index from —0.1— to —0.2— is the measure of the "shifting of the zero" of the scale due to the expansion of the volumes of the liquids G and O for the rise of the temperature from $t°$ to $(t+x)°$.

To correct the "shifting of the zero" (tank filled up to line —1.1—, temperature= $(t+x)°$, (Fig. 5) it is necessary to set back to —0.0— the index; to obtain this the level of the liquid G in the left cistern must be lowered from —4.4— to —5.5— (calculable); inside the right cistern obviously the level of liquid G will move in the opposite direction, (rise).

Figure 6:
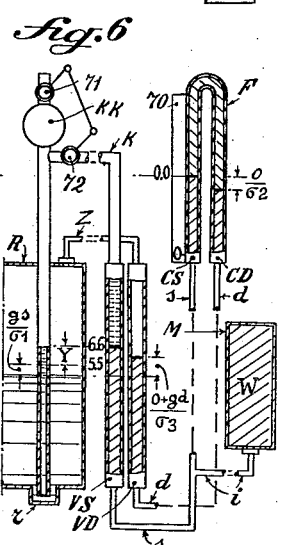

*Correction of the "shifting of the zero."*— A way to obtain those changes of the levels of the liquid G is to substitute for a part of the liquid B, above the liquid G in the left cistern, a corresponding volume of the heavier liquid G. (Fig. 6.) A column Y of liquid G ought to be calculated so that, substituted to an equal column of liquid B should keep (the tank being filled up to line —1.1—) the index in the same position —0.0— that it had at the temperature $t°$. The same column Y of liquid G will keep the index still along the graduated scale not only in case of the tank being filled up to line —1.1— but also for any height H of the liquid B in the tank. The volume $Y\sigma_1$ of the column Y may be considered as the "increase of volume"= $W\alpha_2 x$ of a volume W (at $t°$ degrees) of liquid G due to the rising of its temperature from $t°$ to $(t+x)°$, $\alpha_2$ being the coefficient of cubic expansion of the liquid G. The volume W (at $t°$ degrees) then will be contained, with actual exclusion of air or gas, in a receptacle M (Fig. 6), which through its only aperture and connecting pipes will communicate with the bottom of the left cistern VS; when the temperature rises from $t°$ to $(t+x)°$ a volume $Y\sigma_1$ of liquid G will be pushed towards the cistern where it will generate the column Y needed for the correction.

To calculate the column Y, and hence the volume W, it is useful to consider an apparatus non-compensated (that is an apparatus in which the sections of the connecting pipes —s— and —d— are alike, and the sections of the tubes and cisterns are so chosen as to obtain the more convenient "index travel per unit;" in this apparatus the volumes GS and GD differ at the utmost only because of different sections $\sigma$, $\sigma_1$, $\sigma_2$, $\sigma_3$, chosen, the sections of —s— and —d— being equal and their length being equal. The volumes of the liquids G and O inside the tubes and the cisterns corresponding to the levels —0.0— and —1.1— (Fig. 1) and adopting for clearness sake the symbols $gs$, $gd$ and $o$ (lower case letters) as symbols for the volumes corresponding to the volume increase, due to a rise of temperature, of the volumes GS, GD and O (capital letters), $\alpha_1$, $\alpha_2$, $\alpha_3$ being the coefficients of cubic expansion for the liquid in the tank, for the transmitting liquid and for the indicating liquid, let us write:—

$gs = GS\alpha_2 x$ = increase of volume GS for a rise of temperature from $t°$ to $(t+x)°$ $gd = GD\alpha_2 x$ = increase of volume GD for a rise of temperature from $t°$ to $(t+x)°$ $o = O\alpha_3 x$ = increase of volume O for a rise of temperature from $t°$ to $(t+x)°$.

$\dfrac{gs}{\sigma_1}$ = height of a column of liquid of volume $gs$ and section $\sigma_1$ $\dfrac{gd}{\sigma_3}$ = height of a column of liquid of volume $gd$ and section $\sigma_3$ $\dfrac{o}{\sigma_2}$ = height of a column of liquid of volume $o$ and section $\sigma_2$ $\dfrac{o}{\sigma_3}$ = height of a column of liquid of volume $o$ and section $\sigma_3$ In Fig. 6 are represented the columns:

$$\frac{gs}{\sigma_1}, \frac{gd}{\sigma_3}, \frac{o}{\sigma_2}, \frac{o}{\sigma_3},$$

the sum $$\frac{o}{\sigma_3}+\frac{gd}{\sigma_3}=\frac{o+gd}{\sigma_3}$$

and the column Y in their relative position for the condition "shifting of the zero "corrected at the temperature $(t+x)°$; condition expressed by the formula:

$$(\delta 22-\delta 11)\left(Y+\frac{gs}{\sigma_1}\right)=(\delta 22-\delta 33)\frac{o}{\sigma_2}+$$
$$\delta 22\frac{gd}{\sigma_3}+\delta 22\frac{o}{\sigma_3}$$

from which $$Y=\left(\frac{\delta 22-\delta 33}{\delta 22-\delta 11}\frac{o}{\sigma_2}+\frac{\delta 22}{\delta 22-\delta 11}\frac{o}{\sigma_3}\right)+$$
$$\left(\frac{\delta 22}{\delta 22-\delta 11}\frac{gd}{\sigma_3}-\frac{gs}{\sigma_1}\right) \quad \text{(III)}$$

and substituting for $o$, $gs$, $gd$ their expressions $$Y=\left(\frac{\delta 22-\delta 33}{\delta 22-\delta 33}\frac{1}{\sigma_2}+\frac{\delta 22}{\delta 22-\delta 11}\frac{1}{\sigma_3}\right)\alpha_3\cdot x\cdot O+$$
$$\left(\frac{\delta 22}{\delta 22-\delta 11}\frac{1}{\sigma_3}GD-\frac{1}{\sigma_1}GS\right)\alpha_2\cdot x$$

The formula clearly shows that Y is a function of the volume O and of the volumes GS and GD contained in the non-compensated apparatus; accordingly Y may be considered as made of two parts: $Y_1$ and $Y_2$, being: $Y=Y_1+Y_2$, and:

$$Y_1=\left(\frac{\delta 22-\delta 33}{\delta 22-\delta 11}\frac{1}{O_2}+\frac{\delta 22}{\delta 22-\delta 11}\frac{1}{\sigma_3}\right)\alpha_3\cdot x\cdot O$$

(function of O) (IV)

$$Y_2=\left(\frac{\delta 22}{\delta 22-\delta 11}\frac{1}{\sigma_3}GD-\frac{1}{\sigma_1}GS\right)\alpha_2\cdot x$$

(function of GS and GD) (V)

As previously stated, the column Y has been considered produced by the expansion of a volume W of liquid G contained at $t°$ in a receptacle M (Fig. 6); said volume becoming: $W(1+\alpha_2 x) = W + W.\alpha_2.x$ at $(t+x)$ degrees, the volume W having been so calculated, the coefficient $\alpha_2$ of cubic expansion for the liquid G being known, as to have the volume $W.\alpha_2.x$ equal to the volume $Y\sigma_1$ of a liquid column of height equal to Y and of section equal to the section $\sigma_1$ of the left cistern VS; but any liquid or more than one liquid, conveniently handled, could be used for producing the column $Y = (Y_1 + Y_2)$ for example Fig. 7 shows a volume $W_1.O$ of liquid O and a volume $W_2.G$ of liquid G contained in a receptacle $M_1$ (to be substituted for the recipient M of Fig. 6) for producing the column Y.

As it will be explained later it is convenient to consider separately that portion of the "shifting of the zero" due to the expansion of volume O and that portion due to the expansion of the two volumes GS and GD, therefore two correcting volumes must be calculated; one for the generation of the column $Y_1$ the other for the generation of the column $Y_2$.

The column $Y_1$ may be generated by the expansion of a volume $W_1.O$ of liquid O or by the expansion of a volume $W_1.G$ of liquid G, becoming: the former $= W_1.O(1+\alpha_3 x)$, the other $= W_1.G(1+\alpha_2 x)$ when their temperature rises from $t°$ to $(t+x)°$ and so calculated as to have:

$$W_1.O\alpha_3 x = W_1.G\alpha_2 x = Y_1\sigma_1 = \text{volume of column } Y_1$$

The column $Y_2$ similarly may be generated by the expansion of a volume $W_2.O$ of liquid O or by the expansion of a volume $W_2.G$ of liquid G, becoming: the former $= W_2.O(1+\alpha_3 x)$, the other $= W_2.G(1+\alpha_2 x)$ when their temperature rises from $t°$ to $(t+x)°$ and being so calculated as to have:

$$W_2.O\alpha_3 x = W_2.G\alpha_2 x = Y_2\sigma_1 = \text{volume of column } Y_2$$

In any case the two volumes chosen (preferably: $W_1.O$ and $W_2.G$ or $W_1.G$ and $W_2.G$) should be algebraically added to the left connecting pipe in order to generate, because of their expansion, inside the left cistern VS, the two columns $Y_1$ and $Y_2$. $(Y_1+Y_2=Y.)$

*Remarks.*—Two liquids of different density and nature (as G and O) have ordinarily different coefficients of cubic expansion ($\alpha_2$ and $\alpha_3$), moreover the coefficient of expansion of any liquid has not a constant value but varies with the temperature; it follows that the ideal correction will only be attained by means of the two liquids G and O, that is by means of the volumes $W_1.O$ and $W_2.G$. Considering also that all the liquid that fills the apparatus concurs, if at a temperature different from $t°$, to create the "shifting of the zero" and that it concurs proportionately to: its volume, temperature and coefficient of expansion, it will be justified to distribute the two chosen compensating volumes along the apparatus (transmitter, connecting pipes, indicator) proportionately to the volume of liquid contained in any single section of the same: any unit of the compensating volumes will then be near the volume of the liquid (of the apparatus not compensated) that it ought to compensate and of which it will assume the temperature as it is necessary. From the precedent formulas it follows:

$$W_1.O = \frac{Y_1\sigma_1}{a_3.x} = \left(\frac{\delta 22 - \delta 33}{\delta 22 - \delta 11} \cdot \frac{\sigma_1}{\sigma_2} + \frac{\delta 22}{\delta 22 - \delta 11} \cdot \frac{\sigma_1}{\sigma_3}\right) O. \quad \text{(VI)}$$

$$W_1.G = \frac{Y_1\sigma_1}{a_2.x} = \left(\frac{\delta 22 - \delta 33}{\delta 22 - \delta 11} \cdot \frac{\sigma_1}{\sigma_2} + \frac{\delta 22}{\delta 22 - \delta 11} \cdot \frac{\sigma_1}{\sigma_3}\right)$$

$$\frac{a_3}{a_2}.O = \frac{a_3}{a_2}.W_1.O \quad \text{(VII)}$$

$$W_2.G = \frac{Y_2\sigma_1}{a_2.x} = \frac{\delta 22}{\delta 22 - \delta 11} \cdot \frac{\sigma_1}{\sigma_3} GD - GS. \quad \text{(VIII)}$$

$$W_2.O = \frac{Y_2\sigma_1}{a_3.x} = \left(\frac{\delta 22}{\delta 22 - \delta 11} \cdot \frac{\sigma_1}{\sigma_3} GD - GS\right)\frac{a_2}{a_3} = \frac{a_2}{a_3}.W_2.G \quad \text{(IX)}$$

These formulas point out clearly that the volumes compensating the "shifting of the zero" would be determined only by the volumes O, GS and GD, fixed at $t°$ for the apparatus noncompensated, if the coefficients, made up with the values of the densities, appearing in the formulas should be constant at any temperature; this not being the case, different correcting volumes would be necessary for each temperature. However these coefficients vary so little that the correcting volumes calculated making up the coefficients with the values of the densities at $(t+x)°$ are to be considered exact, with very close approximation, for all the temperatures.

The calculated volumes $W_{1.O}$, $W_{2.G}$, etc. compensate a negative "shifting of the zero" due to a rising of temperature and a positive "shifting" due to a fall of temperature as well; in the first case through them a column Y of liquid G will be substituted in the left cistern to a column Y of liquid B, in the second case the contrary happens.

The error of the "shifting of the zero", due to a rise or fall of temperature, ($x$ positive or $x$ negative), is constant, in absolute value, for any height H of the liquid B in the tank; hence this error will be the more serious when the smaller is the height H, that is: just when the maximum precision of reading would be needed. It is therefore obvious the necessity of correcting the error of the "shifting of the zero." This error is a function of the distance between transmitter and indicator, because with said distance the volume of liquid G contained inside the connecting pipes increases; in case of a large distance, the compensating volume $W_{2.G}$ (VIII) or $W_{2.O}$ will be large (IX).

*Cases to be considered*

(1) Fig. 6 shows the correction by means of a volume $W = W_{1.G} + W_{2.G}$ (as told in the beginning of the exposition about the correction of the "shifting of the zero") of liquid G contained in a receptacle M that communicates with the bottom of the left cistern.

(2) In Fig. 7 the receptacle M is substituted by a receptacle $M_1$ containing the two compensating volumes $W_{1.O}$ and $W_{2.G}$; volume $W_{1.O}$ of the lighter liquid O will gather higher above the liquid G, and there will not be any risk for it passing into the connecting pipe —s— containing liquid G and hence into VS or CS being source of incorrect reading.

(3) Correction made by means of the two volumes $W_{1.O}$ and $W_{2.O}$ Fig. 7 both of liquid O contained in a recipient which is like recipient $M_1$ of Fig. 7. The lower part of the recipient ought to be filled with liquid G (a small per cent of the volume GS) to avoid the risk mentioned in case 2.

(4) The Figure 8 shows the correction made distributing the volume $$W = W_{1.G} + W_{2.G}$$

of liquid G along the left connecting pipe whose diameter is therefore larger than that of the right one.

(5) The Fig. 9 shows the correction made by distributing only the volume $W_{2.G}$ along the left connecting pipe and concentrating into an enlargement N of the left connecting pipe the volume $W_{1.G}$. The enlargement N is located close to the indicator, because $W_{1.G}$ is the volume destined to correct the "shifting of the zero" of the scale originated from the expansion of the volume of liquid O contained in the indicator itself.

(6) Correction as in case 5, volume $W_{1.G}$ is however contained in a receptacle as N, Fig. 10, near the indicator and communicating with the left connecting pipe.

(7) Fig. 10 shows the best way of correction: the volume $W_{2.G}$ of liquid G is distributed inside the left connecting pipes $s$, the volume $W_{1.O}$ of liquid O is concentrated into the recipient $N_1$, communicating by its lower end with the left connecting pipe and located near the two tubes; in the same recipient $N_1$ there is also a small quantity of liquid G (a small per cent of the volume $W_{2.G}$) that only will flow towards the left connecting pipe in case of rising of temperature, because the liquid O contained in $N_1$ shall not in any case get out of it and reach the connecting pipe to avoid the risk that it should join the liquid O contained inside the two tubes falsifying completely the indications of the apparatus.

In case of an apparatus installed on board of an automobile, aeroplane, ship etc., the line (in a drawing representing the horizontal projection of the apparatus) uniting the centres of the two cisterns and the line uniting the the centres of the two tubes should be oriented the same way in order that it should be possible to correct a certain "error of indication" connected with the apparatus itself and due to the possible inclination, obviously simultaneous, of the axes of the cisterns and of the tubes from the vertical position.

In the figures drawn the said condition is embodied if the axes of the two cisterns and of the two tubes are supposed lying in two planes parallel with the sheet of paper. An axis perpendicular to the sheet (therefore a point of the sheet) may represent the longitudinal axis of the automobile, etc. on board of which the apparatus is installed. In practice it is possible: an inclination (forward or backward) of said longitudinal axis, to which a forward or backward inclination of a certain angle will correspond, with reference to the vertical, of the axes of the cistern and tubes, or it is possible a rotation of a certain angle of the apparatus around the longitudinal axis, that is a transverse inclination.

Figure 1:
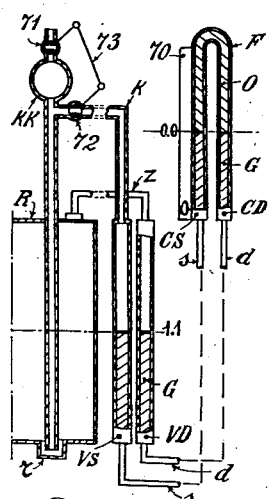
Figure 2:
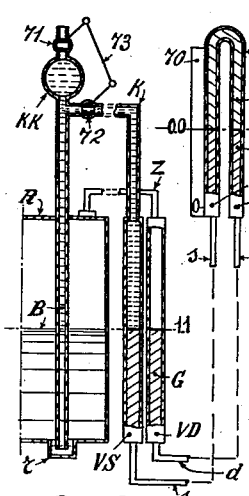

With the supposition made Fig. 1 shows clearly that the inclination of the longitudinal axis cannot modify the position of the index along the scale.

*Rotation around the longitudinal axis and means to prevent motion of the index in this case*

After the rotation (Fig. 13) it is supposed that the four points of intersection of lines —0.0— and —1.1— (Fig. 12) with the axes of the cistern and tubes continue to indicate the level of the liquid G inside them as in Fig. 12 (tank empty, tubes and cisterns filled up to their middle height of liquid G). Let $c, c_1, v$ and $v_1$ be four horizontal lines containing the four said points; between the two horizontal lines $c$ and $c_1$ are included two columns of equal height $= sc$, one of liquid O, the other of liquid G; between the two horizontal lines $v$ and $v_1$ is included a column of liquid O of height $= sv$. If it is wanted that the position of the index does not vary, that is: it should be identical before and after the rotation, the hydrostatical pressures of the three columns ought to counterbalance themselves; it should be:

$$sc.(\delta 2 - \delta 3) = sv.\delta 2$$

equivalent to:

$$dc.(\delta 2 - \delta 3) = dv.\delta 2$$

hence:

$$dc : dv = \delta 2 : (\delta 2 - \delta 3)$$

The preceding formula may be used to figure out the distance $dc$ between the two tubes as a function of the distance $dv$ of the two cisterns in order to avoid the oscillations of the index in the case that also the condition of parallelism between the plane containing the axes of the two tubes and the plane containing the axes of the two cisterns is satisfied.

The liquid B in the tank placed on board of an automobile etc., will oscillate while the automobile is in motion, the point where it will oscillate the less will be the centre of the horizontal section of the tank, the best place for the transmitter will therefore be the centre of the tank as shown in Fig. 11. The vertical leg of the siphon and the axis of the left cistern ought to be parallel and as near as possible.

The horizontal distance between transmitter and indicator may concur, in the case that the automobile (aeroplane, dirigible, ship etc.) is inclined, to increase the vertical distance between the summit of the tubes and the bottom of the tank, distance that as said before should not exceed a certain limit: hence there will arise a limit also for the said horizontal distance.

For the correct action of the apparatus, specially if installed on board of an automobile etc., it is better if the axes of the cisterns and of the tubes are vertical. In the case of the transmitter inside the tank an inclined position of the cisterns may facilitate its application, but in this case the sections of the cisterns to be introduced in the formulas should be the right sections divided by the cosine of the angle that the inclined axes make with the vertical.

If $\delta 3 > \delta 2$, that is if the liquid O is denser than the liquid G it will be necessary to give the apparatus the constructional form shown in Fig. 15; in this form the bridge connection F, through which the tubes intercommunicate, connects them at their lower end, while the two connecting pipes from the cisterns reach the higher end of these tubes, with the advertence that the left cistern VS by means of the pipe connections —s— should communicate with the tube CD and the cistern VD by means of the pipe connection —d— with the tube CS; this particularity however to the only end of avoiding the oscillations of the index, due to the movement of the apparatus when installed on board of an automobile etc. with the artifice of making the ratio of the distance of the axes of the tubes to the distance of the axes of the cisterns equal to the ratio of the density of the liquid G to the difference of density between O and G, as shown by the proportion:

$$dc : dv = \delta 2 : (\delta 3 - \delta 2)$$

The graduated scale 70, because of that transposition of the connections of the connecting pipes to the tubes, is applied to the tube CS, inside which the index will rise or fall with the rising or falling of the liquid B in the tank R. Should not said transposition have been made the graduated scale ought to have been applied to the tube CD instead of CS but in this case the oscillations of the index, due to the reason before mentioned, could not be counteracted.

Also with the constructional form shown in Fig. 15 ($\delta 3 > \delta 2$) it will be possible to correct the error of the "shifting of the zero" due to the expansion of the liquids G and O, but it ought to be considered that in the present form of the apparatus the expansion of the liquid O causes a rising of the index while the expansion of the liquid G a falling of the index, hence the correction of the "shifting of the zero" must be made on the two parts, right and left, of the apparatus.

The correcting volume $W_1$ that corrects the shifting of the zero due to the expansion of the liquid O, will be contained in a receptacle N located near the tubes and communicating with the connecting pipe —d—, and therefore with the right cistern VD, or it will fill near the tubes an enlargement of the same connecting pipe —d—. The correcting volume $W_2$, that corrects the error due to the expansion of the liquid G, will be contained in a receptacle M" communicating with the connecting pipe —s—, and hence with the left cistern VS, or it will be distributed in the most convenient way along the part of the apparatus to which the transmitting cistern VS belongs.

The method of calculation for the form shown in Fig. 15 of the "index travel per unit" and of the correcting volumes $W_1$ and $W_2$ is like the method used for the form of Fig. 1.

For both the constructional forms (Fig. 1 and Fig. 15) the liquid B contained in the tank may be identical to liquid G. The apparatus will continue to indicate regularly the variation of level of the liquid in the tank, but it will not be any more possible to correct the error of the "shifting of the zero" in case of Fig. 1. In the case of Fig. 15 it will only be possible to correct the error due to the expansion of the liquid O by means of a volume $W_1$ contained in a receptacle located near the tubes and communicating with the connecting pipe —d— and hence with the cistern VD, or contained in an enlargement of the connecting pipe —d— near the tubes.

The calculating of the apparatus in the case that the liquid B in the tank is identical to the transmitting liquid G does not meet with difficulties, after all it is only a particular case of the more general case already fully considered.

In the drawings is shown a receptacle KK which with its bottom communicates with the highest point of the siphon K, while on top of it there is an opening fitted with a cock 71. This opening is used for the charging of the siphon; the function of the receptacle KK is that of collecting the air that, from the tank R, may get in there through the vertical leg of the siphon especially when the tank is almost empty; the siphon will function so long as the air accumulates inside the recipient KK and keeps out of the siphon: If the air reaches the siphon it will be necessary to fill again the siphon and the receptacle KK with the liquid B by opening the valve 71 and sucking through it; during this operation it is convenient to close the valve 72 located along the leg of the siphon which communicates with the cistern VS in order to avoid sucking liquid from same. Cocks 71 and 72 are preferably tied by means of a suitable mechanism 73 (Fig. 1) so that the closed position of the one shall correspond to the open position of the other and vice versa.

The two cocks 71 and 72 may eventually be substituted by a two ways cock embodying the recipient KK and having, for example, the form shown in Fig. 16. In this case the cock comprises the body 74, closed at the two ends, capable of communicating with the outside through the fitting 75; into which body 74 opens the leg K' of the siphon coming from the left cistern VS and the leg K'' that reaches the bottom of the tank R. The outlets of K' and of 75 inside the cock body are controlled by the cock plug 76, which from the outside may be turned by means of the button 77 while forced against the packing ring 79 within by the spring 78. The plug, which occupies only a part of the cavity of the cock body, is provided with a longitudinal groove 76' which may be set facing the outlet K' or 75. The balance of the cavity, with which the leg K'' continuously communicates, takes the place of the recipient KK formerly described and may be made to communicate with the leg K' or with the outside, through 75, by turning the plug 76 so as to realize the normal condition of functioning of the apparatus or that corresponding to the charging of the siphon.

It will not always be possible to have in the bottom of the tank the small cavity —r— into which sinks the vertical leg of the siphon, in this case it may be substituted by a small saucer —r'— (Fig. 14) with a rim about a cent'metre high fixed to the foot of the leg; immediately above the saucer will be, secured around the leg and inclosed into a perforated container, a small bunch 80 of cotton waste or of glass wool or of any other suitable material which will gradually drain inside the saucer the liquid absorbed during the oscillations of the tank. Of course in this case it will be necessary to give up the reading of the last centimetre of the liquid contained in the tank.

Of course the present invention is not at all restricted to the dispositions shown and explained but without getting far away from its principle can undergo all the modifications that the circumstances and the practical needs might suggest as necessary or useful.

I claim.

1. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa.

2. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings, and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, and an air collecting chamber at the top of the siphon having an exhausting passage leading from said chamber for starting the siphon and a passage to the cistern, and a valve control for said passages.

3. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmittting liquid may function as an index as it rises with the rising of the liquid in the tank and vice versa, the axes of said tubular cisterns and the branches of said tube being arranged in two parallel planes, the relation between the distance apart of the indicating tube branches and the distance apart of the cisterns being equal to the relation between the density of the transmitting liquid in the cisterns and the difference between the densities of the transmitting liquid and of the indicating liquid in the indicating tube, and the index bearing branch and the siphon fitted cistern being placed, each in its plane, on the same side of the other branch and of the other cistern respectively, to correct for error when the apparatus is rotated about an axis perpendicular to said parallel planes.

4. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, said cisterns being arranged at the center of the tank.

5. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, the indicating tube being inverted-U-shaped and the indicating liquid lighter than the transmitting liquid, and the connecting pipe leading from the siphon fitted cistern being the same connecting pipe leading also from the index bearing branch, said cistern being connected to said branch.

6. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, the indicating tube being U-shaped and the indicating liquid being heavier than the transmitting liquid and the connecting pipe leading from the siphon fitted cistern being other than that leading from the index bearing branch, said cistern not being connected to said branch.

7. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of said cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, a liquid compensating mass being added to the ensemble of transmitting and indicating liquids contained in the corresponding non-compensated apparatus,—that is the apparatus in which the connection of each cistern to its branch is very simply made by a plain pipe of cross-section uniform and equal for both connections—, said compensating liquid mass, through its own dilatation, affecting the level of the transmitting liquid in the cisterns and therefrom compensating for displacements of the index that would otherwise arise because of volume changes, due to temperature changes, of the indicating liquid contained in the apparatus, being added to the connecting pipe leading from the index bearing branch and concentrated in a receptacle branched, close to the indicating tube, to the connecting pipe, and a receptacle for holding said compensating mass branched to said pipe, the compensating liquid mass being preferably formed by a liquid of the same nature as that of the indicating liquid.

8. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of the cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, a liquid compensating mass being added to the ensemble of transmitting and indicating liquids contained in the corresponding non-compensated apparatus,—that is the apparatus in which the connection of each cistern to its branch is very simply made by a plain pipe of cross-section uniform and equal for both connections—, said compensating liquid mass, through its own dilatation, affecting the level of the transmitting liquid in the cisterns and therefrom compensating for displacements of the index that would otherwise arise because of volume changes, due to temperature changes, of the indicating liquid contained in the apparatus, being added to the connecting pipe leading from the index bearing branch and concentrated, close to the indicating tube, inside an enlargement of the connecting pipe, and an enlargement in said pipe for holding said compensating liquid mass, the compensating liquid mass being formed by a liquid of the same nature as that of the transmitting liquid.

9. In a liquid level indicating apparatus, an indicating tube having two connected branches and partly filled with an indicating liquid, a pressure transmitter comprising two adjacent tubular cisterns one for each branch, piping connecting each cistern to its branch, and a pressure transmitting liquid, non-miscible with the indicating liquid and with the liquid to be gauged, filling part of the cisterns, filling the pipings and the remaining portions of the indicating tube, a tank and a siphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, a liquid compensating mass being added to the ensemble of transmitting and indicating liquids contained in the corresponding non-compensated apparatus,—that is the apparatus in which the connection of each cistern to its branch is very simply made by a plain pipe of cross-section uniform and equal for both connections,—said compensating liquid mass, through its own dilatation, affecting the level of the transmitting liquid in the cisterns and therefrom compensating for displacements of the index that would otherwise arise because of volume changes, due to temperature changes, of the transmitting liquid contained in the apparatus, being added to the connecting pipe leading from the siphon fitted cistern and distributed inside it, and an increased cross-section figured for said connecting pipe to supply room for holding said compensating liquid mass, the compensating liquid mass being formed by a liquid of the same nature as that of the transmitting liquid, and the two connecting pipes, running from the cisterns to the indicating tube branches, being laid parallel and close to each other.

10. In a liquid level indicating apparatus, an indicating tube having two connected branches and partly filled with an indicating liquid, a pressure transmitter comprising two adjacent tubular cisterns, one for each branch, piping connecting each cistern to its branch, and a pressure transmitting liquid, non-miscible with the indicating liquid and with the liquid to be gauged, filling part of the cisterns, filling the pipings and the remaining portions of the indicating tube, a tank and a syphon connecting one cistern with the liquid in the tank at the maximum depth to be indicated, a pipe connecting the gas space above the liquid in the tank with the other cistern whereby the indicating liquid in one of the indicating tube branches is subjected to the combined hydrostatic pressure of the liquid to be measured and the gas above it and in the other branch to the gas pressure only, and a graduated scale alongside the index bearing branch which is the branch in which the plane of separation between the indicating liquid and the transmitting liquid may function as an index as it rises with the rising of the liquid in the tank and vice versa, a liquid compensating mass being added to the ensemble of transmitting and indicating liquids contained in the corresponding non-compensated apparatus,— that is the apparatus in which the connection of each cistern to its branch is very simply made by a plain pipe of cross-section uniform and equal for both connections—, said compensating liquid mass, through its own dilatation, affecting the level of the transmitting liquid in the cisterns and therefrom compensating for displacements of the index that would otherwise arise because of volume changes, due to temperature changes, of the transmitting liquid contained in the apparatus, being added to the connecting pipe leading from the siphon fitted cistern by lodging it inside a receptacle branched at a suitable point to the connecting pipe, and a receptacle for holding said compensating liquid mass branched to said connecting pipe, the compensating liquid mass being preferably formed by a liquid of the same nature as that of the transmitting liquid, and the two connecting pipes, running from the cisterns to the indicating tube branches, being laid parallel and close to each other.

In testimony that I claim the foregoing as my invention, I have signed my name.

GIUSEPPE GIANOLIO.